Figure 1:
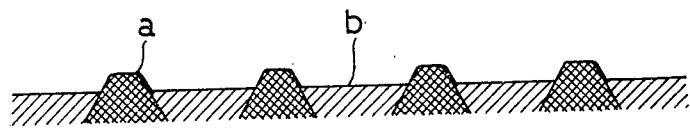

United States Patent [19]

Ishimori et al.

[11] 3,945,893
[45] Mar. 23, 1976

[54] PROCESS FOR FORMING LOW-ABRASION SURFACE LAYERS ON METAL OBJECTS

[75] Inventors: Shigeru Ishimori, Hamana; Shinjiro Otsuka, Hamamatsu, both of Japan

[73] Assignee: Suzuki Motor Company Limited, Japan

[22] Filed: Dec. 27, 1973

[21] Appl. No.: 428,655

[30] Foreign Application Priority Data
Dec. 30, 1972  Japan.................................. 47-2353

[52] U.S. Cl............... 204/16; 204/35 R; 204/129.1
[51] Int. Cl.²..... C25D 5/52; C25D 7/10; C25F 3/00
[58] Field of Search............ 204/35 R, 129.1, 16, 36

[56] References Cited
UNITED STATES PATENTS

| | | | |
|---|---|---|---|
| 240,107 | 4/1881 | Eaton............................... | 204/129.1 |
| 299,055 | 5/1884 | Collins................................ | 204/16 |
| 2,314,604 | 3/1943 | Horst................................ | 204/35 R |
| 2,858,256 | 10/1958 | Fahnde et al. ....................... | 204/16 |
| 2,999,798 | 9/1961 | Eitel et al........................... | 204/35 R |
| 3,395,092 | 7/1968 | Ribes............................... | 204/129.1 |
| 3,434,942 | 3/1969 | Waterman......................... | 204/35 R |
| 3,591,468 | 7/1971 | Nishid et al...................... | 204/35 R |
| 3,666,636 | 5/1972 | Tomaszewski et al................ | 204/16 |
| 3,676,308 | 7/1972 | Brown................................... | 204/16 |
| 3,762,882 | 10/1973 | Grutza ................................. | 204/16 |
| R12,567 | 11/1906 | Case .................................. | 204/16 |

*Primary Examiner*—R. L. Andrews
*Attorney, Agent, or Firm*—Joseph P. Gastel

[57] ABSTRACT

Fine particles of a very hard material such as silicon carbide and either a solid lubricant such as carbon fluoride or a lubricant such as a powdered organic high polymer are dispersed in a metal plating solution, and a metal object to be plated is immersed as a cathode, together with a metal rod as an anode, in the plating bath, and then a suitable current is passed through the bath to cause coprecipitation of the fine particles and lubricant in the metal deposit. The plated coating layer thus obtained is electro-polished or chemically or mechanically polished and a given thickness of the metal layer is removed to leave the fine particles as tiny protrusions from the lowered surface. In this way a low-abrasion surface is produced on the metal object.

18 Claims, 10 Drawing Figures

(I)

Composite-Plated Coating Finished by Electropolishing
(×1000)

(II)

Aeroview Corresponding to Micrograph (I)
(×1000)

(I)

(II)

PROCESS FOR FORMING LOW-ABRASION SURFACE LAYERS ON METAL OBJECTS

This invention relates to a process for forming low-abrasion surface layers on metal objects.

In order to produce such wear-resistant surfaces, it has been customary to mix into a base metal another metal of a different kind, cast the mixture together to a desired shape, allowing a substance, such as a carbide, of greater hardness than the base metal to precipitate separately and then finish the casting to provide a low-abrasion surface, that is, wear resistant surface. Because the conventional process thus involves formation and dispersion of the harder precipitate throughout the matrix, such metal castings are difficult to machine.

The present invention has for its object the provision of a process which utilizes the technique of composite plating and produces a low-abrasion surface by allowing fine particles of a very hard substance and solid lubricant to remain only in the surface layer of a metal object, as partly protruding therefrom. According to the invention, the disadvantage of the prior art process that arises from the necessity of mixing a different metal or metals into the base metal throughout the entire mass of the casting can be eliminated.

Figure 4:
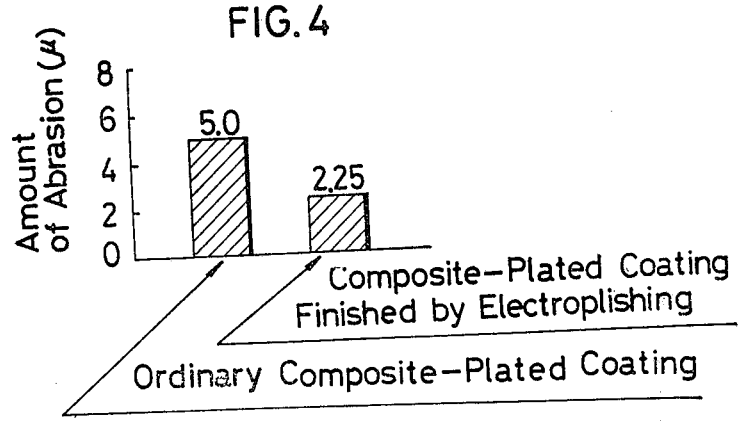
Figure 3:
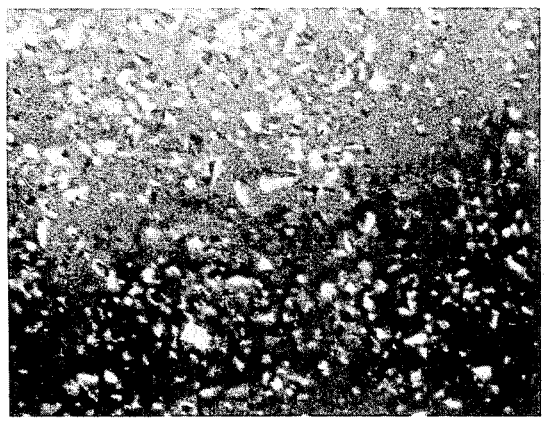
Figure 3:
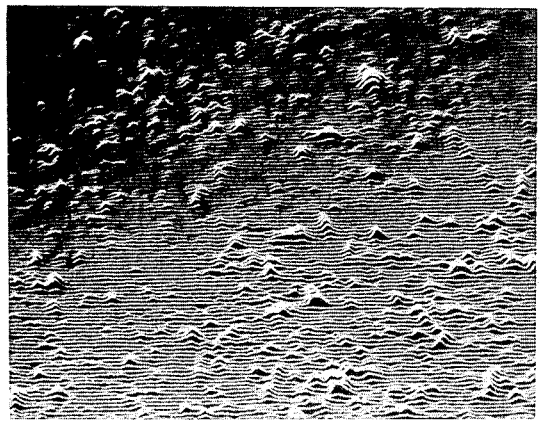

The above and other objects and features of the invention will become apparent more fully from the following description taken in connection with the accompanying drawings showing examples thereof, in which:

FIG. 1 is a schematic sectional view, on an enlarged scale, of a low-abrasion surface obtained in accordance with this invention;

FIGS. 2(A) to (D) are sectional views illustrating the stepwise progress of polishing according to the present invention;

FIGS. 3(I) and (II) are, respectively, a micrograph of composite-plated coating after electropolishing of the surface and an aeroview of the same surface;

FIG. 4 is a graph comparing the results of tests on cylinders of internal-combustion engines with the interiors having composite-plated coatings formed by an ordinary process and by the process of this invention.

Figure 5:
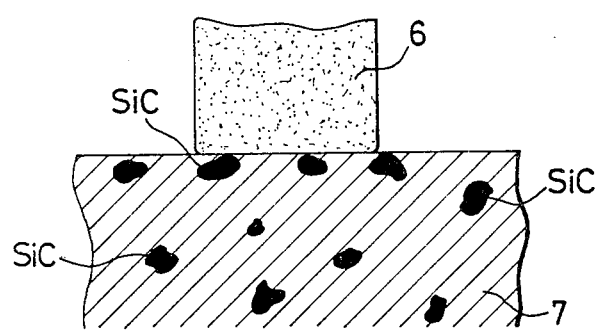
Figure 5:
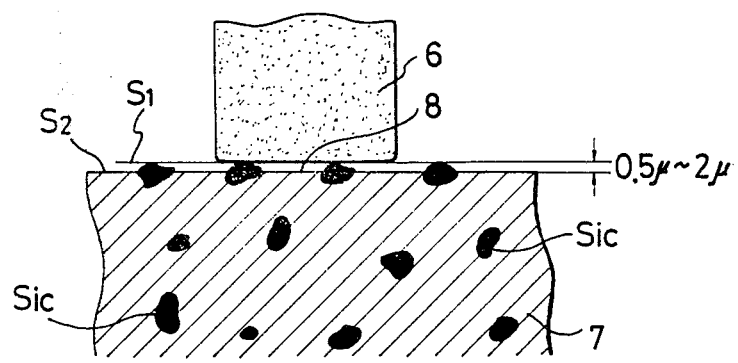

FIGS. 5(i) and (ii) are sectional views of a compositeplated cylinder wall before and after polishing, respectively.

The term "composite plating" as herein used means a process whereby electroplating is carried out with an ordinary metal plating bath in which particles of an electrically nonconductive material are dispersed, so that, as the result of the coprecipitation the nonconductive particles precipitate separately in the plated coating. (For details refer to Japanese Patent Publication No. 3806/1961.)

For example, if fine particles of a very hard material are dispersed in a metal plating bath and a suitable current is passed through the bath, making the object to be plated as a cathode and a metal rod held opposite to the object as an anode, a plated coating will result as consisting of a metal deposit in which the high-hardness fine particles precipitate separately.

The metal deposit formed in this way on the base metal surface is then subjected to electrolytic, chemical or mechanical polishing so that a given thickness of the metal coating is removed, leaving the hard, fine particles partly exposed and protruded from the deposit layer.

Thus, as shown in FIG. 1, a primary sliding face $a$ and a secondary sliding face $b$ are formed, the latter being lower than the former because of the removal of metal. Lubricating oil is retained on the secondary sliding face $b$ for constant lubrication of the primary sliding face $a$, or the actual sliding surface. Just after electrolytic or chemical polishing, the protruding fine particles of hard material, for example, silicon carbide, have such sharp corners that they may scratch or otherwise damage the surface to contact the plated surface. Therefore, if it is desirable because of the material of the surface facing the fine particle protrusion, the primary sliding face may be further finished conventionally, for example by grinding, lapping, or honing with a plastic polishing wheel.

Coprecipitative substances for use in composite plating may be enumerated in the form of fine particles of a hard material, a solid lubricant and a lubricant of a powdered organic high polymer.

The above-mentioned fine particles of a hard material may be silicon carbide and tungusten carbide and a solid lubricant may be carbon fluoride, fluorocarbon polymer [(CF)n] and molybdenum disulfide. And a lubricant of a powdered organic high polymer may be synthetic rubber. All these coprecipitative substances are used either singly respectively or may be used in combination, as the case may require. Suitable metal ingredients are metals that can be electroplated, e.g., nickel, zinc, chromium, copper, and tin. The fluorocarbon polymer is manufactured by the Japan Carbon Co., Ltd.

In accordance with the present invention, the major metal ingredient of the composite-plated coating is partly removed by electrolytic, chemical or mechanical polishing to allow the separate or dispersed precipitate to protrude about 0.1 to 5 microns from the coating surface. The polishing exposes the dispersed precipitate from the matrix, with an increasing number of protrusions like rocks emerging on the ebb. If the dispersed precipitate is fine particles of a hard material, the coating surface is finished by lapping with an ordinary lapping composition to obtain a low abrasion surface. The type of polishing, electrolytic, chemical or mechanical, that is to be adopted is governed by the kind of the metal to form the matrix of the composite plated coating, and the polishing is carried out by a conventional procedure.

The present process will be described in more detail hereunder with examples in which nickel was used as the major metal ingredient or matrix and silicon carbide as a separate or dispersed precipitate.

Powdered silicon carbide was dispersed in a nickel plating solution, and the cylinder block of an internal-combustion engine (aluminum alloy casting) was immersed as a cathode in the bath, with a nickel rod opposite to the work as an anode, and then, passing a suitable current (usually 20 $A/dm^2$) through the bath, a plated coating of nickel and silicon carbide was formed on the inner wall of the cylinder in the usual manner.

The particle size of silicon carbide was so distributed that powder of a desired size, large or small, could be chosen according to the intended use. The concentration of the silicon carbide in the plating solution is 50-250 g/l. Usually the silicon carbide to be used ranged in particle size from 0.1 to 10 $\mu$. The nickel plating solution used was a bath of nickel sulfamate. It was composed of 826 ± 46 g/$l$ of a 60% nickel sulfamate solution, 15.1 ± 1.7 g/$l$ 96 percent nickel chloride solution, 45 ± 5 g/l 99.5 percent boric acid, and 2.9 ± 0.7 g/l saccharin sodium solution. The plating solution contained (150 g/l) (silicon carbide.) The nickel-silicon carbide coating layers thus formed ranged from 100 to 500 μ in thickness.

Figure 2:
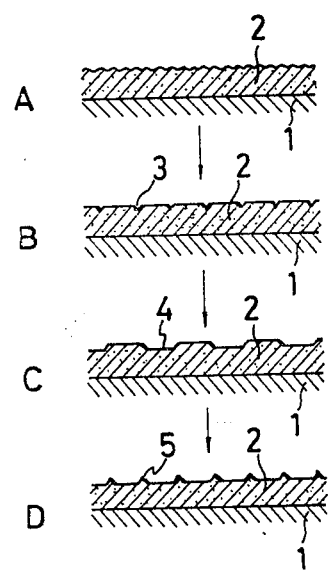

The coating layer was electropolished. The polishing proceeded in three stages as represented in FIGS. 2(A) through (D). FIG. 2(A) shows the composite-plated coating layer prior to the electropolishing. The reference numeral 1 indicates the base metal, and 2 indicates the composite-plated coating layer formed thereon. FIG. 2(B) shows the coated surface in the first stage of electropolishing, with pits 3 formed scatteredly. In the second stage shown in (C) the pits 3 were transformed into recesses 4. In the third and last stage shown in (D) the recesses 4 developed sidewise to leave only minute protrusions of silicon carbide 5 behind.

Useful as low-abrasion surfaces are the surfaces polished to the extent of the second or third stage shown.

In electropolishing, the electrolysis of a metal surface as an anode immersed in a suitable electrolyte will gradually dissolve the anode metal, forming a multiplicity of pits particularly due to the removal of surface impurities and textural irregularities. [FIG. 2(B)]. The dissolved metal salt will form an anode film with which to fill up the surface depressions. In the lands, on the other hand, the metal salt concentration is low and the anode film is thin, so that the current preferentially flows through the lands to accelerate their dissolution. Especially when the metal forms complex ions with the electrolyte, the electric resistance produced is higher than that of the original electrolyte, and the current concentration in the lands is promoted. Accordingly the percentage the lands account for the total metal surface area is decreased, thus presenting a surface condition where the surface area left unpolished is limited as shown in FIG. 2(C). With the progress of the electrolysis, the unpolished surface is dissolved and a smooth polished surface is obtained. In the electrolysis of a composite-plated film wherein some coprecipitated substance is embedded, the substance will be exposed in the form of tiny protrusions from the polished surface upon the removal by dissolution of the surrounding metal. In this way the condition of FIG. 2(D), or the electropolished surface to which the present invention is directed, is attained.

Now the actions of silicon carbide and carbon fluoride will be discussed. These substances to be added for coprecipitation are embedded by composite plating into the resulting coated layer. They are related to the improvements in the properties, e.g., heat resistance, hardness, lubricity, and wear resistance, of the coated layer formed by the plating. To be more exact, the physical properties inherent to the coprecipitative substances contribute to the improvements in those properties of the coating. In the composite plating wherein silicon carbide is coprecipitated, the great hardness or a beneficial property of silicon carbide improves the wear resistance of the composite-plated coating. In the case of carbon fluoride, its lubricity adds to the wear resistance of the coating. Microscopic observation of the coating surface formed by ordinary composite plating indicates that the coprecipitative substance is embedded in the sub-surface layer and therefore it cannot be said that the substance has really improved the physical properties of the coating surface. The metal ingredients constituting the composite-plated coating are worn off by the running-in of the sliding assembly. In order to reduce this initial wear due to running-in, it is necessary to allow the coprecipitated substance to protrude on the surface. The protrusions form a primary sliding face along which another member slides in a relative movement. Here the physical properties of the primary sliding face are those of the coprecipitated substance. It follows that if a coprecipitated substance has great hardness on lubricity, the primary sliding face will attain improved wear resistance. Directly contributory to the improvement in the wear resistance of the metal surface is a separately or dispersedly precipitatable substance such as silicon carbide or carbon fluoride and the process of electrolytic, chemical or mechanical polishing whereby the precipitate is caused to protrude from the surface so that the desirable properties of the precipitate can be fully taken advantage of. A wear-resistant metal surface is obtained. Thus it is only with the addition of a separately or dispersedly formed precipitate and through the polishing process that a wear-resistant metallic surface can be obtained. Without either of the factors, no wear-resistant metal surface would result. In other words, such metal surface would not be obtained if neither silicon carbide nor carbon fluoride was added.

The particle sizes and concentrations in the plating baths of the coprecipitative substances employed in the present invention were as tabulated below. These values can be used as compositions of combined plating solutions which have been respectively explaind already.

| Substance | Particle size ($\mu$) | Concentration (g/l) |
|---|---|---|
| Silicon carbide, SiC | 0.1 – 10 | 50 – 250 |
| Tungsten carbide, WC | 1 – 20 | 10 – 150 |
| Fluorocarbon polymer, (CF)n | 0.1 – 15 | 2 – 60 |
| Molybdenum disulfide, $MoS_2$ | 0.1 – 10 | 10 – 100 |
| Aluminum oxide, $Al_2O_3$ | 0.1 – 10 | 25 – 200 |
| Synthetic rubber, SBR rubber | 0.01 – 0.3 | 1 – 100 |

Particle sizes and concentrations of coprecipitative substances

The kinds of plating baths, current densities, and plating rates used were as follows:

| Nickel plating bath | | |
|---|---|---|
| Composition | 60% nickel sulfamate sol. | 826 ± 46 g/l |
| | Nickel chloride (96%) | 15.1 ± 1.7 g/l |
| | Boric acid (99.5%) | 45 ± 5 g/l |
| | Saccharin sodium | 2.9 ± 0.7 g/l |
| Current density | 15 – 20 A/dm² | |
| Plating rate | 100 μ/hr | |
| Copper plating bath | | |
| Composition | Copper sulfate (99.5%) | 220 ± 20 g/l |
| | Sulfuric acid (97%) | 47 ± 17 g/l |
| Current density | 2 – 5 A/dm² | |
| Plating rate | 30 μ/hr | |

| Nickel plating bath | | |
|---|---|---|
| Zinc plating bath | | |
| Composition | Zinc sulfate (99.5%) | 240 g/l |
| | Ammonium chloride (99%) | 15 g/l |
| | Aluminum sulfate (51 ~ 57%) | 30 g/l |
| | Sodium acetate (98%) | 15 g/l |
| | Glucose | 120 g/l |
| Current density | 2 – 4 A/dm$^2$ | |
| Plating rate | 40 μ/hr | |
| Tin plating bath | | |
| Composition | Stannous sulfate (96%) | |
| | Sulfuric acid (97%) | |
| | Cresol-sulfonic acid (90%) | |
| | β-Naphthol (98%) | |
| | Gelatin | |
| Current density | 2 A/dm$^2$ | |
| Plating rate | 35 μ/hr | |
| Chrome plating bath | | |
| Composition | Chromic anhydride (95%) | 250 g/l |
| | Sulfuric acid (97%) | 2.5 g/l |
| Current density | 30 – 70 A/dm$^2$ | |
| Plating bath | 25 μ/hr | |

Examples of the electropolishing of composite-plated coatings other than of silicon carbide are given below:

| Copper-molybdenum disulfide composite plating | | |
|---|---|---|
| Bath composition | Copper sulfate (99.5%) | 220 g/l |
| | Sulfuric acid (97%) | 50 g/l |
| | Molybdenum disulfide (2μ) | 30 g/l |
| Current density | 2 A/dm$^2$ | |
| Electropolishing | Under the conditions given in Example 1 (6). | |
| Zinc-tungsten carbide composite plating | | |
| Bath composition | Tungsten carbide (2 μ) | 50 g/l |
| | Zinc sulfate (99.5%) | 240 g/l |
| | Ammonium chloride (99%) | 15 g/l |
| | Aluminum sulfate (51–57%) | 30 g/l |
| | Sodium acetate (98%) | 15 g/l |
| | Glucose | 120 g/l |
| Current density | 2 A/dm$^2$ | |
| Electropolishing | Under the conditions given in Example 1 (3). | |
| Chrome-aluminum oxide composite plating | | |
| Bath composition | Aluminum oxide (3.5 μ) | 100 g/l |
| | Chromic anhydride (95%) | 250 g/l |
| | Sulfuric acid (97%) | 2.5 g/l |
| Current density | 50 A/dm$^2$ | |
| Electropolishing | Under the conditions given in Example 1 (4). | |
| Tin-aluminum oxide composite plating | | |
| Bath composition | Aluminum oxide (3.5 μ) | 100 g/l |
| | Stannous sulfate (96%) | |
| | Sulfuric acid (97%) | |
| | Cresol-sulfonic acid (90%) | |
| | β-Naphthol | |
| | Gelatin | |
| Current density | 2 A/dm$^2$ | |
| Electropolishing | Under the conditions given in Example 1 (7). | |
| Nickel-fluorocarbon polymer composite plating | | |
| Bath composition | Fluorocarbon polymer (8 μ) | 20 g/l |
| | 60% nickel sulfamate sol. | 826 ± 46 g/l |
| | Nickel chloride (96%) | 15.1 ± 1.7 g/l |
| | Boric acid (99.5%) | 45 ± 5 g/l |
| | Saccharin sodium | 2.9 ± 0.7 g/l |
| Current density | 15 A/dm$^2$ | |
| Electropolishing | Under the conditions given in Example 1 (1). | |
| Nickel-SBR latex composite plating | | |
| Bath composition | SBR latex (0.2 μ) | 10 g/l |
| | 60% nickel sulfamate sol. | 826 ± 46 g/l |
| | Nickel chloride (96%) | 15.1 ± 1.7 g/l |
| | Boric acid (99.5%) | 45 ± 5 g/l |
| | Saccharin solution | 2.9 ± 0.7 g/l |
| Current density | 15 A/dm$^2$ | |
| Electropolishing | Under the conditions given in Example 1 (1) | |

EXAMPLE 1

The plated coating of nickel and silicon carbide formed in the manner described above was electropolished with different electrolyte compositions under different conditions as follows:

(1) Electrolyte composition

| Perchloric acid (60%) | 8 vol.% |
|---|---|
| Ethyl alcohol (99.5%) | 70 |
| Butyl cellosolve (98%) | 10 |

-continued (1) Electrolyte composition

| Pure water | 12 | | |
|---|---|---|---|
| Electrolytic conditions | | | |
| Current | 80 – 300 A/dm² | Optimum current | 150 A/dm² |
| Cathode | Stainless steel | | |
| Temp. | 20 – 40°C | Optimum temp. | 30°C |
| Time | 15 – 60 sec. | Optimum time | 30 sec. |

The electrolyte was prepared by placing perchloric acid into a mixed solution of ethyl alcohol, butyl cellosolve, and pure water immediately before use.

This electrolyte uses perchloric acid and has the danger of decomposition and explosion. In handling it, therefore, adequate care should be taken to ensure the safety. The electrolyte must be prepared immediately before use, while keeping it cool in a well ventilated place lest the liquid temperature should rise. The procedure of electrolyte preparation starts with the pouring of pure water into the tank to be subsequently filled with the electrolyte. Next, ethyl alcohol is slowly added dropwise to the pure water while the latter is being cooled by internal or external cooling means. Butyl cellosolve is then dropped into the mixture of pure water and ethyl alcohol. Finally, perchloric acid is added dropwise immediately before the use of the resulting electrolyte. This is important to avoid the decomposition of the acid. The dropping of the acid should be slowly carried out while agitating the mixed solution. The mixture must be continuously cooled so that the temperature never exceeds 40° C. During the course of electrolysis, care must also be used to preclude any sparking due, for example, to a failure of contact in the electric system. This precaution is necessary to prevent an explosion of the perchloric acid as a result of a temperature rise or an explosion of the hydrogen gas produced by the cathode.

(2) Electrolyte composition

| Phosphoric acid (85%) | 15 – 25 vol.%, | preferably 20 vol.% |
|---|---|---|
| Sulfuric acid (97%) | 50 – 60 | preferably 55 |
| Aniline (99%) | 0.5 | preferably 0.5 |
| Pure water | 20 – 35 | preferably 24.5 |
| Electrolytic conditions | | |
| Current | 10 – 30 A/dm² | Optimum current 13 A/dm² |
| Cathode | Lead | |
| Temp. | 50 – 60° C | Optimum temp. 55° C |
| Time | 15 – 90 sec. | Optimum time 45 sec. |

(3) Electrolyte composition

| Phosphoric acid (85%) | 20 – 80 vol.%, | preferably 50 vol.% |
|---|---|---|
| Sulfuric acid (97%) | 5 – 40 | preferably 25 |
| Hydrochloric acid (35–37%) | 0.1–3 | preferably 1 |
| Pure water | 10 – 35 | preferably 24 |
| Electrolytic conditions | | |
| Current | 14 – 30 A/dm² | Optimum current 15 A/dm² |
| Cathode | Lead | |
| Temp. | 40 – 60° C | Optimum temp. 50° C |
| Time | 30 – 180 sec. | Optimum time 120 sec. |

(4) Electrolyte composition

| Phosphoric acid (85%) | 65 – 73 vol.%, | preferably 65 vol.% |
|---|---|---|
| Sulfuric acid (97%) | 15 | preferably 15 |
| Chromic anhydride (95%) | 2 – 10 | preferably 10 |
| Water | 10 | preferably 10 |
| Electrolytic conditions | | |
| Current | 5 – 20 A/dm² | Optimum current 10 A/dm² |
| Cathode | Lead | |
| Temp. | 50 – 60° C | Optimum temp. 55° C |
| Time | 90 – 240 sec. | Optimum time 120 sec. |

(5) Electrolyte composition

| Phosphoric acid (85%) | 60 – 70 vol.%, | preferably 65 vol.% |
|---|---|---|
| Sulfuric acid (97%) | 10 – 20 | preferably 15 |
| Perchloric acid (60%) | 0.1–1.5 | preferably 0.5 |
| Pure water | 5 – 30 | preferably 19.5 |
| Electrolytic conditions | | |
| Current | 10 – 50 A/dm² | Optimum current 15 A/dm² |
| Cathode | Lead | |
| Temp. | 50 – 80° C | Optimum temp. 65° C |
| Time | 90 – 240 sec. | Optimum time 180 sec. |

(6) Electrolytic composition

| Phosphoric acid (85%) | 65 – 75 vol.%, | preferably 70 vol.% |
|---|---|---|
| Chromium trioxide (95%) | 5 – 15 | preferably 10 |
| Pure water | 10 – 30 | preferably 20 |
| Electrolytic conditions | | |
| Current | 15 – 25 A/dm² | Optimum current 20 A/dm² |
| Cathode | Lead | |
| Temp. | 40 – 70° C | Optimum temp. 60° C |
| Time | 90 – 180 sec. | Optimum time 120 sec. |

(7) Electrolyte composition

| Phosphoric acid (85%) | 65 – 80 vol.%, | preferably 70 vol.% |
|---|---|---|
| n-Butanol (95%) | 15 – 20 | preferably 18 |
| Pure water | 10 – 20 | preferably 12 |
| Electrolytic conditions | | |
| Current | 40 – 80 A/dm² | Optimum current 60 A/dm² |
| Cathode | Stainless steel | |
| Temp. | 20 – 50° C | Optimum temp. 40° C |
| Time | 120 – 240 sec. | Optimum time 180 sec. |

(8) Electrolyte composition

| Phosphoric acid (85%) | 40 – 90 vol.%, | preferably 60 vol.% |
|---|---|---|
| Glycerin (95%) | 10 – 50 | preferably 30 |
| Pure water | 0 – 40 | preferably 10 |
| Electrolytic conditions | | |
| Current | 20 – 100 A/dm² | Optimum current 60 A/dm² |
| Cathode | Stainless steel | |
| Temp. | 50 – 90° C | Optimum temp. 75° C |
| Time | 30 – 180 sec. | Optimum time 120 sec. |

EXAMPLE 2

The plated coating of nickel and silicon carbide formed as above was chemically polished in different ways as follows:

(1) Composition of chemical polishing solution

| Phosphoric acid (85%) | 45 – 60 vol.%, | preferably 53 vol.% |
|---|---|---|
| Nitric acid (60 – 62%) | 10 – 15 | preferably 12 |
| Sulfuric acid (97%) | 15 – 25 | preferably 20 |
| Pure water | 10 – 20 | preferably 15 |
| Polishing conditions | | |
| Temperature | Over 65° C, | preferably 70° C |
| Time | 5 – 20 sec., | preferably 10 sec. |

(2) Composition of chemical polishing solution

| Sulfuric acid (97%) | 50 – 70 vol.%, | preferably 60 vol.% |
|---|---|---|
| Nitric acid (60 – 62%) | 20 – 40 | preferably 30 |
| Pure water | 10 | preferably 10 |
| Polishing conditions | | |
| Temperature | Over 70° C, | preferably 80° C |
| Time | 10 – 30 sec., | preferably 15 sec. |

(3) Composition of chemical polishing solution (with pure water as solvent)

| Chromium trioxide | 200 g/l | (The composition used in the example was the same as the one specified here.) |
|---|---|---|
| Sodium nitrate | 200 | |
| Sodium hydrogen sulfate | 300 | |
| Polishing conditions | | |
| Temperature | 70 – 95° C, | preferably 80° C |
| Time | Over 4 min., | preferably over 5 min. |

(4) Commercially available chemical polishing solution:

"Alchemize LB-Ni (prepared by Uemura Kogyo Co.)

| Polishing conditions | | |
|---|---|---|
| Temperature | 60 – 70° C, | preferably 70° C |
| Time (per catalog) | 0.5–6 min., | preferably 45 sec. |

The coating surface before and after the electropolishing with the electrolyte and under conditions specified in Example 1(1) was observed through an electron microscope of the scanning type (magnification 1,000 X) using EPMA and photographed (FIGS. 3(A) and (B) ). An aeroview clearly indicates the protrusion of silicon carbide from the surface of the nickel coating after the polishing.

EXAMPLE 3

1 The interior of the cylinder of a small air-cooled gasoline engine of the two cycle type was compositely plated with nickel and silicon carbide, and the plated coating was then electropolished. Molybdenum disulfide was employed as the lubricant. The amount of abrasion of the polished surface due to test run was compared with that of the surface not electropolished.

Engine: — Single-cylinder, two-cycle gasoline engine, air-cooled, with a cylinder bore of 56 mm.
Run: — 2000 km run on bench test (corresponding to a run along 2000 km of sandy beach)
Plating: — Silicon carbide content of the plated coating — 5.5 (wt. percent)
Polishing: — In conformity with the electropolishing procedure described in Example 1(1).

The amounts of abrasion were determined in the vicinity of the top dead center of the piston rings where the maximum abrasion occurred. The results were as given in FIG. 4. As compared with the amount of abrasion of the ordinary composite-plated coating, that of the coating formed in accordance with this invention was less than a half.

2 Mechanical polishing

For the honing of the composite-plated cylinder wall, mechanical polishing was done using a plastic whetstone containing fine particles of molten alumina. In this way the metal ingredient of the composite-plated coating was selectively removed to leave behind the minute particles of the separate and dispersed precipitate as protrusions.

| Composite-plated coating | Nickel-silicon carbide (containing 6.0 wt.% SiC) | | |
|---|---|---|---|
| Plastic whetstone composition | Polyurethane resin | | 41.2 wt.% |
| | Molten alumina | | 58.8 wt.% |
| Molten alumina | | | |
| for roughing | av. part. size | 34 μ, sp. gr. 0.76 | |
| for finishing composition | av. part. size | 5 μ, sp. gr. 0.73 | |
| | $Al_2O_3$ | Over | 98.5 wt.% |
| | $SiO_2$ | Under | 0.3 wt.% |
| | $Fe_2O_3$ | Under | 0.1 wt.% |
| | $TiO_2$ | Under | 0.05 wt.% |

The silicon carbide and tungsten carbide to be added in the form of fine particles of great hardness to the plating bath may contain sericite which acts as a dispersant. Sericite, a variety of muscovite, is particularly fine-grained and is adhesive to the human skin. It has a greasy touch and a silky luster. Its crystals measure at most 20 μ, and the average particle size is 0.3 μ.

In the composite-plated coating yet to be polished, the separately and dispersedly precipitated substance is embedded in the coating layer. Therefore, the composite-plated surface, if subjected to a friction against another metal surface, would wear rapidly because of the direct contact. Also, without polishing the coprecipitated substance so dispersed with desirable properties such as great hardness, self-lubricating property, wear resistance, and/or heat resistance would be largely hidden under the surface of the composite-plated coating. This would naturally make it impossible to take the best advantage of those beneficial attributes of the disposed substances. In order to make it possible, the hidden substance should be exposed in the form of tiny protrusions above the composite-plated coating layer.

By way of exemplification, the sliding of piston rings relative to a cylinder will now be considered. Composite-plated cylinder walls before and after polishing are schematically illustrated in FIGS. 5(i) and (ii). In those figures, the reference character 6 designates a piston ring, 7 a cylinder, and SiC a silicon carbide precipitate dispersedly formed in a composite-plated coating. In the unpolished state, the silicon carbide particles merely "peep" through the coating surface. After the polishing, the particles protrude from the coating surface and form a plane or a first sliding face $S_1$ of silicon carbide, while, at the same time, the nickel matrix of the composite-plated coating constitutes a second sliding face $S_2$. Thus, an oil reservoir 8 to retain lubricating oil is defined between the first sliding face $S_1$ and the second sliding face $S_2$. This eliminates the possibility of abrasive wear due to the lack of lubricant. If a self-lubricating material is employed as the dispersible precipitate, scuffing will no longer take place.

Chemical polishing is simple in procedure because the work has only to be dipped in a polishing bath in order to dissolve out surface metal and provide a smooth metal surface with the protrusions of the dispersed precipitate. However, the requirements the polishing bath must meet are so many that utmost care must be exercised in choosing a proper bath. The polishing mechanism is substantially the same as that for electropolishing. The polishing solution dissolves the metal, producing complex ions on the metal surface. Under the conditions where it is made soluble in water, the soluble complex salt of the metal deposits on the irregular surface, thickly on dents and thinly on lands, while inhibiting the dissolution of the depressed regions and preferentially dissolving the land regions, so that the metal surface is flattened and smoothened. The substance separately and dispersedly precipitated in the metal can be exposed as tiny protrusions from the surface by the use of a polishing solution which dissolves the metal only.

Unlike the electropolishing and chemical polishing above described, mechanical polishing removes metal in a physical way. Therefore, in the mechanical polishing, the fine abrasive particles to be dispersed in the whetstone for honing should have a sufficient hardness to scratch the metal away. To satisfy this requirement, usually the fine particles of silicon carbide or alumina oxide about 5 μ in diameter are employed. With mechanical polishing it is difficult to make the metal surface as smooth as the surfaces finished by electrolytic or chemical polishing. Here the mechanical polishing is intended for roughly removing the metal and exposing the dispersed precipitate in the form of protrusions from the metal surface. As will be obvious from its action, the mechanical polishing is of value in composite plating to form a coating wherein a very hard substance is coprecipitated in the bed of a relatively mild metal. To attain this end the metal surface is first scratched by an abrasive. Since the precipitate is hard enough to remain unscratched by the abrasive, the metal surface is selectively removed, the entire metal surface layer being removed by continued polishing. Stripped of the surrounding metal, the hard precipitate particles remain as protrusions to be exposed to the action of the abrasive. The sharp corners of the protrusions are thus rounded off by the abrasive, which contributes to the provision of a low-abrasion-wear surface. The rounded protrusions of the hard precipitate have fewer chances of scratching the other surface to slide relative to the composite-plated coating. As described, the process is effective for forming a low abrasion surface.

The use of polishing reagents and polishing time will be considered now. The care that must be exercised in the preparation of an electrolytic or chemical polishing solution is similar to the care generally used in handling chemicals. For example, where a preparation of a strong acid and water is to be made, the former must always be added to the latter. The polishing solution thus prepared is placed in a polishing tank equipped with a quartz heater of the immersion type. Upon heating to a temperature that is dictated by the kind of the solution, the polishing solution is now ready for use. What must be done in this stage is to set the current density and polishing time in the case of electropolishing or to set the polishing time in chemical polishing. In setting these conditions it must be noted that there are optimum temperature, current density, and time, which have been chosen to form the desired metal surface, or the flat metal surface from which the particles of hard precipitate protrude, with a minimum of labor (working time and electric power consumption). A haphazard extension of the polishing time is not advisable because it simply reduces the thickness of the composite-plated coating, thus affecting the desirable metal surface, and constitutes a mere waste of labor.

The hard substances other than silicon carbide and tungsten carbide which may be adopted in the process of the present invention include alumina oxide, zirconium carbide, titanium carbide, and boron carbide. Of those hard substances, alumina oxide is used in composite plating and then electropolished in the manner described above. In the case of titanium carbide, the plating under the following conditions gives good results:

Nickel-titanium carbide composite plating
Bath composition
Titanium carbide (1 $\mu$) 30 g/l
60% nickel sulfamate sol. 826 ± 46
Nickel chloride (86%) 15.1 ± 1.7
Boric acid (99.5%) 45 ± 5
Saccharin sodium 2.9 ± 0.7
Current density 15 A/dm$^2$
Electropolishing Under the conditions described in Example 1 (1) of electropolishing.

Although experiments with zirconium carbide and boron carbide are yet to be conducted, indications are that the results will be similar to those of the experiment with silicon carbide.

The thickness of the composite-plated coating and the amount of polishing required are as follows. The thickness varies with the intended use of the plated articles, but usually a thickness between 100 and 500 $\mu$ is chosen. The amount of polishing, or the thickness of the composite-plated coating to be removed by electrolytic, chemical or mechanical polishing, ranges from 2 to 15 $\mu$. Generally the removal of the surface layer, about 2 to 5 $\mu$ in thickness, will provide a low abrasion surface, that is, a flat and smooth metal surface with dispersed protrusions of a hard, coprecipitative material.

As for chemical polishing, it is only necessary to dip the articles to be polished into a chemical polishing bath. The articles taken out of the bath are thoroughly rinsed with water to be cleaned of the polishing solution, just as in electropolishing. The dipping is practically the only step required in chemical polishing.

The eventual effect of polishing upon the composite-plated coating, that is, the common purpose of electrolytic, chemical, and mechanical polishing, is to allow a dispersed coprecipitative substance to protrude from a smoothened metal surface. Electropolishing causes the metals constituting the composite-plated coating to be dissolved at a controlled rate into the electrolyte, thereby exposing the dispersed hard substance in the form of tiny protrusions from the metal surface. Chemical polishing dissolves and removes the metal ingredients of the coating by the dip in a chemical bath, whereas mechanical polishing removes the metal layer through the agency of an abrasive. It may be said, therefore, that the aim of whatever polishing is to expose a dispersed and originally embedded precipitate in the form of tiny protrusions from the smoothly polished surface of composite-plated coating.

The results and effects of polishing will now be discussed. As has already been stated in connection with the actions of silicon carbide and carbon fluoride, the tiny protrusions of the dispersed hard substance are combined to form a primary sliding face. If the hard precipitate is self-lubricating carbon fluoride, molybdenum disulfide or the like, the lubricity of the hard protrusions of the primary sliding face remarkably reduces the abrasive wear of the mating member that slides relative to the primary face. In the case of a cylinder compositely plated but not polished in accordance with the present invention in sliding engagement with a cast iron piston, a maximum wear occurs on the both members, in the vicinity of the top dead center of the piston. Responsible for this is the lack of lubricating oil in the proximity of that point, or the failure of the oil to reach the top dead center. On the other hand, the composite-plated coating polished in conformity with the invention has an oil reservoir between the primary and secondary sliding faces. Lubricating oil retained in this reservoir is constantly supplied to the primary sliding face. If a separate, dispersed substance of great hardness is used, the primary sliding face will scarcely wear and the constant supply of lubricating oil will smoothen the relative sliding motion of the two members. Hence there is little abrasive wear of the associated member and no danger of seizure. If the compositely plated cylinder wall is not polished, it will have such a large area of contact with the opposing member that irregular wear, seizure or other trouble tends to occur due to inadequate oil supply. As will be obvious from the foregoing, polishing is not intended for simply abrading the composite-plated surface but for smoothening the coating surface by removing part of the metals constituting the coating by electrolytic, chemical or physical means and thereby exposing an embedded precipitate in the form of tiny protrusions. The metal surface thus formed is resistant to abrasive wear as described above.

What is claimed is:

1. A method for forming a low-abrasion surface on a base member comprising the steps of electrolytically depositing a metal coating to form a permanent bond with said base member and simultaneously codepositing fine particles of a hard material as a precipitate in said metal coating, removing a predetermined surface portion of said metal coating to permit said fine particles to protrude above the surface of said metal coating, and applying lubricating oil to said surface which acts as a reservoir for said lubricating oil.

2. A method as set forth in claim 1 wherein said metal coating is deposited to a depth of between about 100 $\mu$ and 500 $\mu$.

3. A method as set forth in claim 2 wherein said fine particles of a hard material are of a size of between about 0.1 $\mu$ and 20 $\mu$.

4. A method as set forth in claim 3 wherein said fine particles of a hard material protrude between about 0.1 $\mu$ and 15 $\mu$ above the surface of said metal coating.

5. A method as set forth in claim 2 wherein said fine particles of a hard material protrude between about 0.1 $\mu$ and 5 $\mu$ above the surface of said metal coating.

6. A method as set forth in claim 2 wherein said fine particles of a hard material are of a size of between about 0.1 $\mu$ and 10 $\mu$.

7. A method as set forth in claim 1 including the step of codepositing fine particles of a solid lubricant.

8. A method as set forth in claim 7 wherein said fine particles of a solid lubricant are of a size of between 0.1 $\mu$ and 20 $\mu$.

9. A method as set forth in claim 8 wherein said fine particles of a solid lubricant are of a size of between about 0.1 $\mu$ and 10 $\mu$.

10. A method as set forth in claim 4 wherein said fine particles are of a size of between about 0.1 $\mu$ and 20 $\mu$.

11. A method as set forth in claim 10 wherein said particles are of a size of between about 0.1 $\mu$ and 10 $\mu$.

12. A method as set forth in claim 4 including the additional step of mechanically smoothing the surface of said protruding fine particles to reduce their abrasive effect.

13. A method as set forth in claim 4 wherein said hard material particles are selected from the group of silicon carbide tungsten carbide, or aluminum oxide.

14. A method as set forth in claim 1 wherein said surface portion is removed by electrolytic polishing.

15. A method as set forth in claim 1 wherein said surface portion is removed by chemical polishing.

16. A method as set forth in claim 1 wherein said surface portion is removed by mechanical polishing.

17. A method of forming a wear-resistant surface on a base member comprising the steps of electrolytically depositing nickel thereon to form a permanent bond therewith, and simultaneously codepositing silicon carbide of a particle size of between about 0.1 $\mu$ to 10 , so as to provide a total thickness of the deposited material of between about 100 $\mu$ to 500 $\mu$, removing a portion of the nickel coating to permit said silicon carbide to protrude an amount of between about 0.1 $\mu$ and 5 $\mu$ and applying lubricating oil to said surface which acts as a reservoir for said lubricating oil.

18. A method as set forth in claim 17 including the additional step of finishing the outer surfaces of the protruding silicon carbide to remove the sharp edges.

* * * * *

UNITED STATES PATENT OFFICE
CERTIFICATE OF CORRECTION

PATENT NO. : 3,945,893
DATED : March 23, 1976
INVENTOR(S) : Shigeru Ishimori and Shinjiro Otsuka It is certified that error appears in the above–identified patent and that said Letters Patent are hereby corrected as shown below:

Column 13, line 20 (claim 8) after "between" insert --about--;
           line 25 (claim 10) change "4" to --1--.

Column 14, line 1 (claim 12) change "4" to --1--;
           line 5 (claim 13) change "4" to --1--;
           line 7, after "carbide" insert --,--;
           line 18 (claim 17) after "10" insert --μ--.

Signed and Sealed this twenty-second Day of June 1976

[SEAL]

*Attest:*

RUTH C. MASON
*Attesting Officer*

C. MARSHALL DANN
*Commissioner of Patents and Trademarks*